US006857293B2

(12) United States Patent
Carpenter et al.

(10) Patent No.: US 6,857,293 B2
(45) Date of Patent: Feb. 22, 2005

(54) APPARATUS FOR SELECTIVE PHOTOSENSITIZATION OF OPTICAL FIBER

(75) Inventors: James B. Carpenter, Austin, TX (US);
John P. Stedman, Austin, TX (US);
James R. Bylander, Austin, TX (US);
Gordon Wiegand, Austin, TX (US);
Nicholas A. Stacey, Austin, TX (US);
Anthony W. Gatica, Cedar Park, TX (US); Dale E. Elder, Austin, TX (US);
James F. Brennan, III, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 224 days.

(21) Appl. No.: 10/028,838

(22) Filed: Dec. 20, 2001

(65) Prior Publication Data

US 2003/0115911 A1 Jun. 26, 2003

(51) Int. Cl.$^7$ .......................... C03C 25/00; C03C 16/00
(52) U.S. Cl. ........................................ 65/530; 118/58
(58) Field of Search .................. 65/529, 483, 525, 65/530; 118/58, 541, 719, 720, 724, 725, 733

(56) References Cited

U.S. PATENT DOCUMENTS

| | | | | |
|---|---|---|---|---|
| 4,530,750 A | * | 7/1985 | Aisenberg et al. ..... 204/298.24 |
| 4,891,640 A | | 1/1990 | Ip | |
| 5,235,659 A | | 8/1993 | Atkins et al. | |
| 5,287,427 A | | 2/1994 | Atkins et al. | |
| 5,416,863 A | * | 5/1995 | Vengsarkar ................... 385/28 |
| 5,478,371 A | * | 12/1995 | Lemaire et al. ............... 65/384 |
| 5,500,031 A | | 3/1996 | Atkins et al. | |
| 5,547,512 A | * | 8/1996 | Gabor et al. ................. 118/718 |
| 5,596,669 A | | 1/1997 | Murphy et al. | |
| 5,745,615 A | * | 4/1998 | Atkins et al. .................. 385/37 |
| 5,930,420 A | * | 7/1999 | Atkins et al. .................. 385/37 |

(List continued on next page.)

FOREIGN PATENT DOCUMENTS

| | | |
|---|---|---|
| EP | 0805365 A2 | 11/1997 |
| JP | 57029013 | 2/1982 |
| JP | 08286054 | 11/1996 |
| JP | 2001013333 | 1/2001 |

OTHER PUBLICATIONS

X. Li, et al; "A Novel Hydrogen Loading Technique for the Fabrication of Fiber Gratings"; *Optical Fiber and Planar Waveguide Technology* (S.Jian & Y.Liu, Ed.), Proceedings of SPIE vol. 4579, APOC 2001; Beijing, China (Oct. 2001); pp. 142–145.

D.S. Starodubov, et al; "Efficient Bragg Grating Fabrication in a Fibre Through its Polymer Jacket Using Near–UV Light", *Electronics Letters* (Jul. 17, 1997); vol. 33, No. 15; pp. 1331–1333.

(List continued on next page.)

*Primary Examiner*—Steven P. Griffin
*Assistant Examiner*—Carlos Lopez
(74) *Attorney, Agent, or Firm*—Gregg H. Rosenblatt

(57) ABSTRACT

An apparatus that exposes only a selected portion of a length of optical fiber to a hydrogen atmosphere loading process. The apparatus includes a loading chamber that encloses at least the selected portion of the optical fiber and contains a hydrogen hydrogen atmosphere. At least one heating element regionally heats the hydrogen atmosphere surrounding the selected portion. The heating element may heat the hydrogen atmosphere to a temperature of at least 250° C.

32 Claims, 9 Drawing Sheets

U.S. PATENT DOCUMENTS

| | | | |
|---|---|---|---|
| 5,939,136 A | | 8/1999 | Cronk et al. |
| 6,146,713 A | | 11/2000 | Cullen et al. |
| 6,220,059 B1 | * | 4/2001 | Klein et al. .................... 65/394 |
| 6,238,485 B1 | * | 5/2001 | Cullen et al. ............... 118/719 |
| 6,272,886 B1 | | 8/2001 | Novack et al. |
| 6,311,524 B1 | | 11/2001 | Brennan, III et al. |
| 6,327,406 B1 | * | 12/2001 | Cullen et al. ................. 385/37 |
| 6,600,866 B2 | | 7/2003 | Gatica et al. |
| 6,651,814 B2 | | 11/2003 | Higbee et al. |
| 2002/0018623 A1 | * | 2/2002 | Cullen et al. ................. 385/37 |
| 2003/0015139 A1 | | 1/2003 | Afflerbaugh et al. |
| 2003/0074925 A1 | * | 4/2003 | Brennan et al. .............. 65/392 |

OTHER PUBLICATIONS

P.J. Lemaire, et al; "High Pressure $H_2$ Loading as a Technique for Achieving Ultrahigh UV Photosensitivity and Thermal Sensitivity in $GeO_2$ Doped Optical Fibres", *Electronics Letters* (Jun. 27, 1993); vol. 29, No. 13; pp. 1191–1193.

Lemaire, P.J.; "Enhanced UV Photosensitivity in Fibers and Waveguides by High–Pressure Hydrogen Loading", *OFC '95 Technical Digest*, New York (Feb. 26–Mar. 5, 1995); Wed.Afternoon; pp. 162–163.

\* cited by examiner

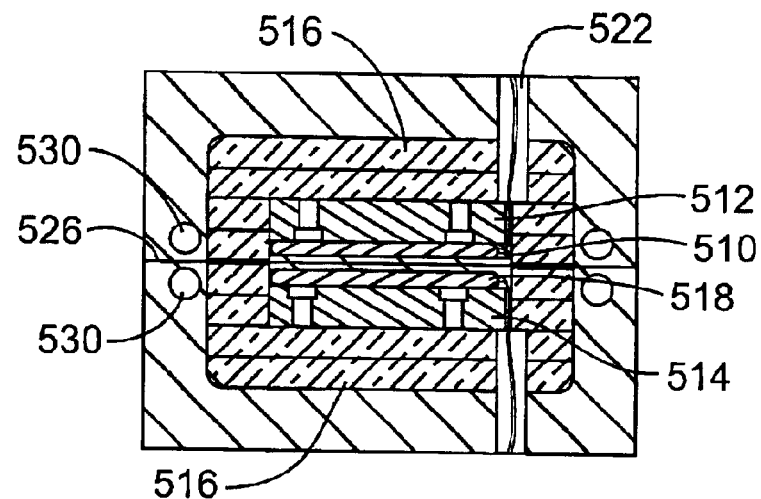
FIG.9
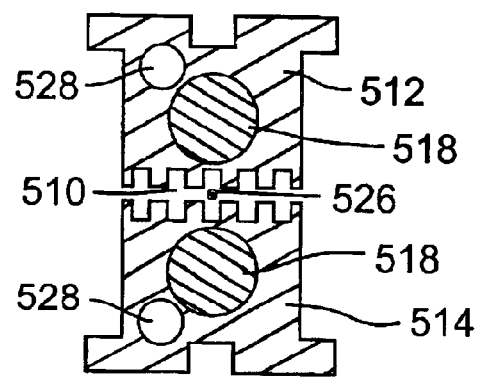
FIG.10
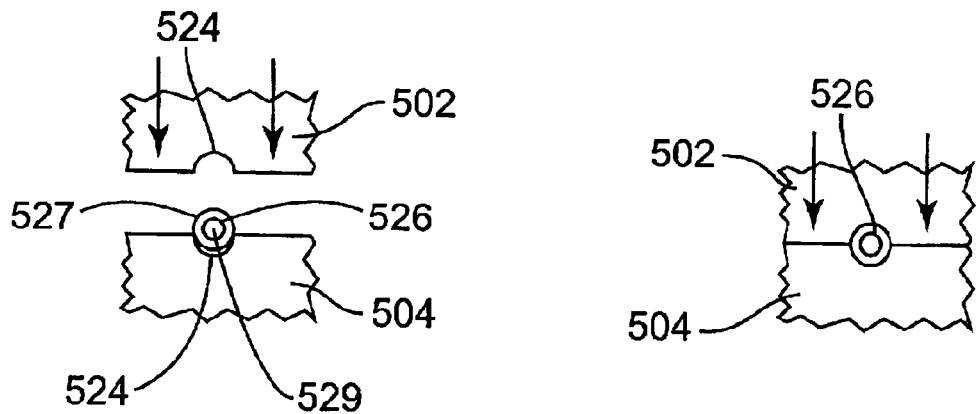
FIG.11a　　　　FIG.11b

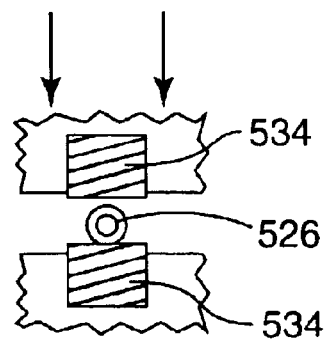
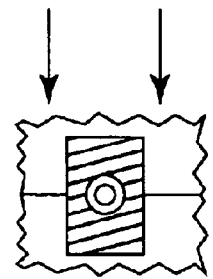
FIG. 12a  FIG. 12b
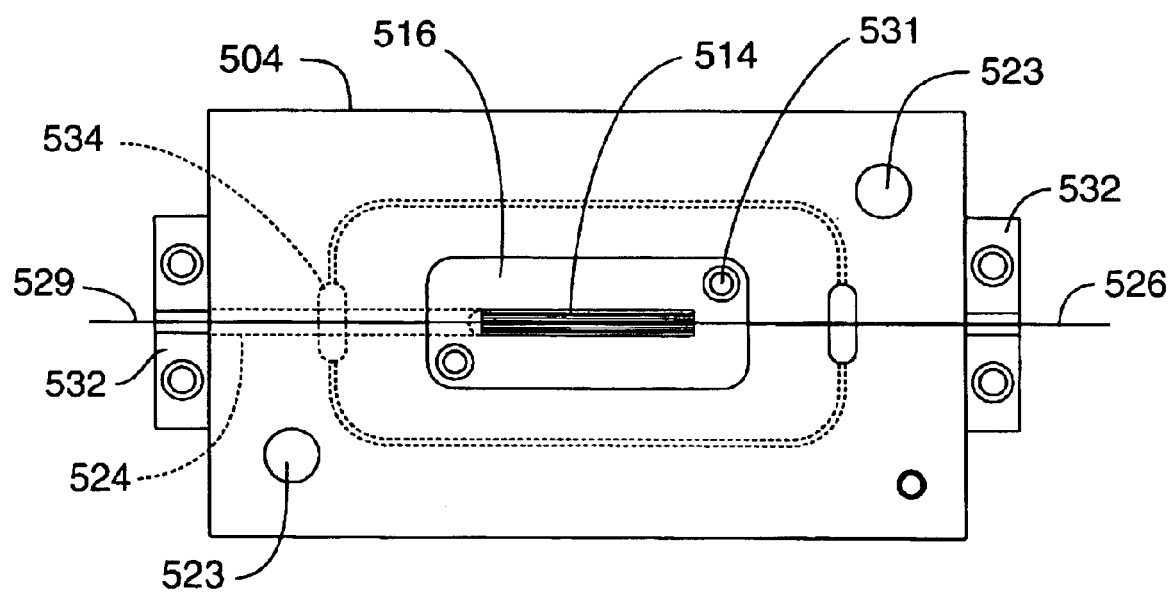
FIG. 13

APPARATUS FOR SELECTIVE PHOTOSENSITIZATION OF OPTICAL FIBER

BACKGROUND OF THE INVENTION

The present invention relates to an apparatus and method for selectively increasing the photosensitivity of selective portions of optical fibers. Specifically, the present invention comprises an apparatus for rapidly diffusing hydrogen or deuterium into selective regions of silica glasses to increase the photosensitivity of these glassy materials, and in particular of optical fibers. In a particular embodiment, the apparatus of the present invention is used in an in-line system for the manufacture of Bragg gratings.

Optical fibers and optical fiber devices are widely used in signal transmission and handling applications. Optical fiber-based devices are vital components in today's expanding high-volume optical communications infrastructure. Many of these devices rely on fiber Bragg gratings (FBG's) to perform light manipulation. An FBG is an optical fiber with periodic, aperiodic or pseudo-periodic variations of the refractive index along its length in the light-guiding region of the waveguide. The ability to produce these refractive index perturbations in a fiber is necessary to manufacture FBG's and, hence, a number of optical components, such as optical sensors, wavelength-selective filters, and dispersion compensators.

Gratings are written in optical fiber usually via the phenomenon of photosensitivity. Photosensitivity is defined as the effect whereby the refractive index of the glass is changed by actinic radiation-induced alterations of the glass structure. The term "actinic radiation" includes visible light, UV, IR radiation and other forms of radiation that induce refractive index changes in the glass. A given glass is considered to be more photosensitive than another when a larger refractive index change is induced in it with the same delivered radiation dose.

The level of photosensitivity of a glass determines how large an index change can be induced in it and therefore places limits on grating devices that can be fabricated practically. Photosensitivity also affects the speed that a desired refractive index change can be induced in the glass with a given radiation intensity. By increasing the photosensitivity of a glass, one can induce larger index perturbations in it at a faster rate.

The intrinsic photosensitivity of silica-based glasses, the main component of high-quality optical fibers, is not very high. Typically index changes of only ~$10^{-5}$ are possible using standard germanium doped fiber.

However, it has been observed that by loading the glass with molecular hydrogen before irradiating it with actinic radiation, one can increase significantly the photosensitivity of the glass. Exposing Ge-doped silica optical fibers to hydrogen or deuterium atmospheres at certain temperatures and pressures photosensitizes the fibers. Index changes as large as $10^{-2}$ have been demonstrated in hydrogenated silica optical fibers.

Prior references have emphasized upper limits on the temperature for such hydrogen loading. For example, U.S. Pat. Nos. 5,235,659 and 5,287,427 discuss a method for exposing at least a portion of a waveguide at a temperature of at most 250° C. to $H_2$ (partial pressure greater than 1 atmosphere (14.7 psi), such that irradiation can result in a normalized index change of at least $10^{-5}$. U.S. Pat. No. 5,500,031, a continuation-in-part of the above-mentioned '659 patent, speaks of a method of exposing the glass to hydrogen or deuterium at a pressure in the range of 14–11,000 psi and at a temperature in the range 21–150° C. The parameters described in these references are probably typical for hydrogen-loading an optical fiber The '031, '659 and '427 references point out problems with hydrogen loading methods in which temperatures exceed 250° C., or even 150° C. In teaching away from higher temperatures, the '659 patent indicates that at high-temperatures "typical polymer fiber coatings would be destroyed or severely damaged" (column 1, lines 51–54). It further emphasizes the fact that "the prior art high temperature sensitization treatment frequently increases the optical loss in the fiber and/or may weaken the fiber" (column 1, lines 54–56). Finally, the '659 patent differentiates itself from the prior art by stating that a high temperature treatment involves "a different physical mechanism" than does a low-temperature treatment. For example, U.S. Pat. No. 5,235,659 explicitly indicates that temperatures of "at most 250° C." should be used.

It has been observed that at higher temperatures the polymer coating, (usually an acrylate material), that protects the glass from harmful chemical reactions in a normal environment will degrade or oxidize (burn). Coatings that have degraded or oxidized and lost their protective value need to be removed and replaced, which can be a difficult and expensive process. Uncoated fiber is fragile, and requires great care during handling.

Most of the gratings written today by industry involve about 5 cm (2 inches or less) of the length of a fiber, depending on the type of grating to be written. Traditionally, it has been taught to place an entire length of optical fiber in a vessel containing hydrogen or deuterium atmospheres at certain temperatures and pressures. The grating manufacturing process usually entails a first process of placing a fiber spool in a hydrogen or deuterium containing vessel, placing the vessel in an oven and loading the entire fiber through the polymer coating.

To achieve the desired level of hydrogen in fiber with conventional hydrogenating methods (~1 ppm), one will typically expose fiber to a hydrogen atmosphere for several days and, in some cases, for several weeks. Exemplary exposures such as 600 hours (25 days), 21° C., at 738 atm or 13 days, 21° C. at 208 atm are reported as typical. Obviously, such long exposures extend the time required to fabricate optical devices that rely on photosensitive glass. Because of the long duration needed for traditional fiber hydrogenation, several pressure vessels are needed in a high-volume production environment to increase throughput and avoid idle time. These vessels are costly to install safely and increase the potential for serious accidents, especially when multiple vessels with separate control valves and gas supply cylinders are involved. Although installing multiple vessels can increase production throughput, the hydrogenation process hampers grating fabrication cycle time, thus new product and specialty product development time can be compromised severely.

Once the length of fiber has been hydrogen-loaded, the coating is stripped (mechanically, chemically or by other means) from the area where the grating is to be written. A technician then uses a source of actinic radiation to write each grating individually. The fibers are then annealed by again heating the fiber to reduce the degradation curve of the gratings. The portion of the fiber that was stripped is then recoated.

The traditional Bragg grating manufacturing processes are slow and do not lend themselves to mass manufacturing.

The traditional hydrogen loading techniques require that the entire length of fiber be subject to the hydrogen loading and heating cycles. The need to expose the entire fiber may result in optical effects on the fiber and places constraints on materials, such as fiber coatings, that may be used. One negative effect of hydrogen loading at higher temperatures is that it may increase the optical loss characteristics of an optical fiber. Furthermore, high-temperature heating cycles may deteriorate optical fiber coatings.

The need remains for a process and enabling machinery that is amenable to higher speed mass manufacturing and that reduces deleterious effects on the optical medium.

SUMMARY OF THE INVENTION

The present invention is directed to an apparatus and a method for selectively exposing only a selected portion of an optical fiber to a hydrogen atmosphere loading process. The apparatus includes a loading chamber that encloses at least the selected portion of the optical fiber and contains a hydrogen gaseous atmosphere. The chamber includes a heating element that locally heats the hydrogen atmosphere surrounding the selected portion. In high-temperature embodiments, the heating element heats the hydrogen atmosphere to a temperature of at least 250° C. Also, the loading chamber may be a pressure chamber capable of containing a pressurized atmosphere. In one particular embodiment, the chamber is designed to contain pressures up to 3,000 psi.

The selected portion may be a midspan portion of a continuous length of fiber, where the loading chamber encloses only the selected portion of the continuous optical fiber.

In one exemplary embodiment, the loading chamber comprises a tube concentrically surrounding only the selected portion of the optical fiber. Gas seals positioned at ends of the tube contain the hydrogen atmosphere while allowing passage of the length of optical fiber. Gas seals also may be attached to end sections of the selected portion of the optical fiber, so the tube becomes sealed as the fiber is placed into position. In another embodiment, the loading chamber comprises a vessel enclosing the entire optical fiber. The vessel may further include a reel-to-reel arrangement, wherein end portions of the length of the optical fiber are wound on laterally spaced reels and the selected portion is suspended midspan. Where the optical fiber is held in a reel-to-reel arrangement, the heating region may be positioned at the midspan portion of the optical fiber.

In yet another embodiment, the apparatus includes a first and a second clamping vessel blocks. The vessel blocks have pockets that define the loading chamber when the vessel blocks are clamped together. The fiber is positioned between the blocks and the blocks close about the selected portion of the fiber to be loaded. Elastomeric re-closable seal may be used to clamp the ends of the selected portion and to contain the gas atmosphere. Alternatively, at least one pressure seal adapted to help contain a gaseous atmosphere within the loading chamber may be physically affixed to the optical fiber.

The elastomer may be a curable elastomer. The pressure seal may be located at a boundary between the selected portion of the optical fiber and a non-selected portion and/or at the ends of a cooling area.

Gas inlet and vent lines may inject and vent the hydrogen atmosphere in the loading chamber. A pre-heating chamber may be used to heat the hydrogen atmosphere prior to introducing the hydrogen atmosphere into the loading chamber.

Particular embodiments include cooling regions that cool or dissipate heat along the portions of the fiber adjacent to the selected portion. A cooling device may regulate the temperature of the cooling region. In one embodiment, cooling tubes are attached to ends of a loading chamber tube. The cooling tubes may include seals that separate the cooling areas from the loading chamber. An embodiment further includes a mechanism that allows the fiber to be moved from the loading chamber to the cooling region. In one specific embodiment, the mechanism comprises a movable magnet and a magnetic body attached to the fiber.

A method in accordance with the present invention for increasing the photosensitivity of a selected portion of an optical fiber includes the step of placing at least the selected portion of the optical fiber in a hydrogen-containing atmosphere. The term hydrogen atmosphere in the present description is intended to include atmospheres including $H_2$, $D_2$, tritium, or molecules such as HD that combine these isotopes of hydrogen. The volume of the hydrogen-containing atmosphere immediately surrounding only the selected portion of the optical fiber is heated to a temperature of at least 250° C. The selected portion of the optical fiber is exposed to the heated volume of the hydrogen-containing atmosphere at a temperature of at least 250° C. for a predetermined time.

In a particular embodiment of the process, only the selected portion of the optical fiber is placed in the hydrogen-containing atmosphere. Pressure seals may be located at a boundary between the selected portion of the optical fiber and a non-selected portion. The pressure seals even may be physically affixed to the optical fiber to help contain a gaseous atmosphere within the loading chamber. In one particular embodiment, the seals are re-closable seals including an elastomeric collet.

The temperature of adjacent portions of the optical fiber may be controlled, either by heat dissipation or by active cooling.

After the step of exposing, the method may further include the step of rapidly changing the atmosphere surrounding the selected portion after the exposing step. This may be done by venting the hydrogen-containing atmosphere from the loading chamber or by physically removing the selected portion from the loading chamber.

The method may further include the step of rapidly cooling the selected portion of the optical fiber after the predetermined time. This may be done, for example, by replacing the hydrogen atmosphere with a cooled inert gas or by physically removing the selected portion from the loading chamber into a cooling chamber.

BRIEF DESCRIPTION OF THE DRAWINGS

FIG. 9 is a cross-sectional detail elevation view of the hydrogen loading chamber of the apparatus depicted in FIG. 7.

FIG. 10 is a cross-sectional elevation view of the heating blocks of the hydrogen loading chamber depicted in FIG. 9.

FIG. 11 is a cross-sectional elevation view of a first embodiment of a clamping mechanism for the loading apparatus illustrated in FIG. 7.

FIG. 12 is a cross-sectional elevation view of a second embodiment of a clamping mechanism for the vessel illustrated in FIG. 7.

FIG. 13 is a top plan view of the lower block of the hydrogen loading apparatus illustrated in FIG. 7.

DETAILED DESCRIPTION OF THE INVENTION

Co-pending, commonly-assigned, U.S. patent application Ser. No. 09/960,174, entitled "Accelerated Method For Increasing The Photosensitivity Of A Glassy Material" filed on Jul. 14, 2000, which is hereby incorporated by reference, describes an accelerated method for hydrogen loading an optical medium in a high-temperature environment. The application discusses how the temperature that the fiber is exposed to in the hydrogen environment will affect the time involved in diffusing the hydrogen molecules into the fiber. Generally, the higher the temperature, the faster is the diffusion rate of hydrogen into the glassy material (e.g., an optical fiber).

Comparing similar fibers, under optimal conditions, a typical grating-quality fiber loaded at 60° C. for 3 days results in an index change of $1 \times 10^{-3}$. Under similar optimal conditions, the same fiber loaded at high temperature, 260° C., for 10 minutes exhibits an index change of $4 \times 10^{-4}$.

However, heating the entire fiber at high temperatures has the potential for affecting both the physical integrity of the optical fibers (in particular, of fibers having coatings that are susceptible to damage at elevated temperatures) and the optical properties of the fiber. Moreover, heating the entire fiber presents challenges as to fiber handling and temperature ramp-up control.

The present invention loads hydrogen and/or deuterium only into the particular portion of the fiber where the grating is to be written and where higher photosensitivity is desired. In a particular embodiment, the loading is done at high-temperatures (>250 degrees C.) and/or high pressures, which accelerates the loading process and allows for the apparatus to be used as a stage in an in-line processing line.

The remainder of the fiber is not heated Adjacent portions of the fiber may even be attached to a heat dissipater or sink or cooled to maintain a cooler temperature. This is especially useful for fibers having coatings that degrade at higher temperatures.

Figure 1:
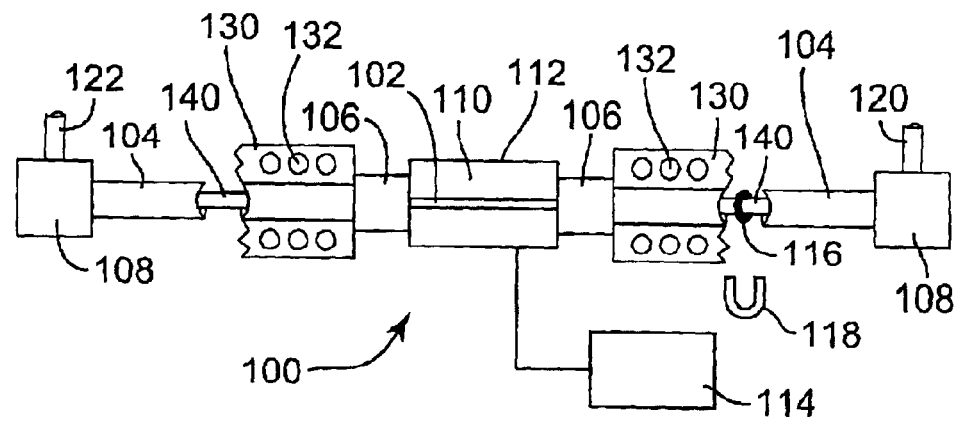
FIG. 1 is a side elevation view of a first embodiment of a hydrogen loading apparatus in accordance with the present invention.
Figure 2:
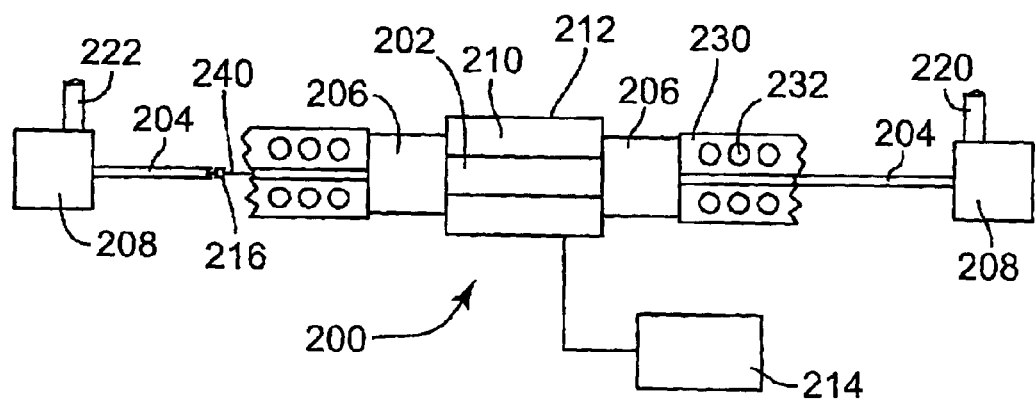
FIG. 2 is a side elevation view of a second embodiment of a hydrogen loading apparatus in accordance with the present invention.

FIGS. 1 and 2 illustrate a first embodiment 100 and a second embodiment 200 of selective loading vessels. The selective loading vessels include the following elements: 1) a controlled pressure and temperature chamber, which may withstand high temperature (>250 degrees C.) and high-pressures, where a selected specific length of fiber can be loaded with hydrogen or deuterium; 2) structural integrity to contain the high-pressure gases (e.g., several hundred atmospheres of hydrogen or deuterium gas); 3) input and output ports for introducing and venting pressurized gasses, 4) and mechanisms for safely installing and removing fibers from the vessels. As it will become apparent, similar elements in these embodiments generally are designated by the same last two reference numerals.

The vessels 100 and 200 are symmetrical and each includes a center heating tube or loading chamber 102 and 202 having a first end and a second end. In the depicted embodiments, both of the tube vessels are constructed from standard high-pressure gas supply tubing. Such tubing is commercially available and is made from 316 stainless steel.

The heating tubes 102 and 202 are surrounded by heating blocks 110 and 210, respectively. The particular heating blocks 110 and 210 are made from aluminum or another thermally conductive material. The heating blocks 110 and 210 are designed to clamp onto the outside diameter of a center portion of the large or small diameter heating tube vessels 102 and 202. The heating blocks 110 and 210 house a plurality of electric cartridge heaters 112 and 212, which are controlled via a programmable logic control system 114 and 214, such as the auto-tuning power control system designed and fabricated by Watlow, of St. Louis, Mo. Alternative embodiments may include other types of electric heaters, foil, hot oil, induction heaters, or other types of heaters.

The heating blocks 110 and 210 may be made in two halves and clamped onto the tube, or made as a single slot collet design that clamps onto the outside diameter of the tube. In another embodiment, the heating blocks 110 and 210 include a concentric collar that threads around the heating tubes. The length of the heating block 110 and 210 is about 5 cm. (~2 inches), the approximate size of the largest "short" grating that is currently written, but could be any length desired.

It must be noted that in the present loading vessels 100 and 200, the fiber to be loaded, 140 and 240 respectively, is one continuous length, with the midspan section that is to be hydrogen loaded located inside the loading chambers 102 and 202, in-between ends of this piece of fiber.

In certain embodiments, the adjacent lengths of fiber located on both sides of the higher temperature loading zone are kept cool enough to prevent thermal energy being conducted or radiated from the loading chamber to degrade adjacent coatings. The embodiments illustrated in FIGS. 1 and 2 include optional cooling tubes or cooling chambers, 104 and 204 respectively. The cooling tubes 104 and 204 are coupled to each one of the ends of the respective center heating tube 102 and 202.

In the embodiment illustrated in FIG. 1, the length of fiber that is not being loaded is not placed in a high-temperature hydrogen atmosphere, but is surrounded by a lower-temperature atmosphere. In alternative embodiments, gas seals may separate the loading chamber and the cooling chambers. An inert gas, such as nitrogen, which may be cooled, may be inserted into the cooling tube to inhibit combustion of organic polymeric coatings.

The vessels 100 and 200 are basically similar, with the differences being the diameters of the heated and cooled tubes. The vessel 100 has a small diameter heating tube 102 and a large diameter cooling tube 104. The vessel 200 has a large diameter heating tube 202 and a small diameter cooling tube 204.

The heating tubes 102 and 202 are connected to the cooling tubes 104 and 204 respectively by connector fittings 106 and 206. The connector fittings 106 and 206 are commercially available and also are made from 316 stainless steel. The length of the entire vessel 100 is approximately 107 cm (~42 inches). This length was selected because traditionally gratings are written on a one (1) meter length of fiber. Alternative embodiments may be made longer or shorter depending on the desired area of exposure, the type of desired grating, and the optical fiber to be used.

Closure fittings 108 and 208 are placed at outer ends of the cooling tubes 104 and 204. Alternatively, the closure fittings also may be placed at the end of the heating tubes 102 and 202. One of the closure fittings includes a gas inlet, 120 and 220, for introducing the loading gases into the vessel. The other closure fitting includes a gas vent or outlet, 122 and 222, for exhausting the loading gases. The closure fittings 108 and 208 are coupled to controlled needle valves to allow the introduction of hydrogen and inert gasses into the vessel through inlets 120 and 220, and out of the vessel through outlets 122 and 222. The piping to any such system also may include high-pressure blowout disks (as a safety device), which are rated at pressures 10% to 20% higher than the highest pressure expected during processing.

The loading process consists of purging the vessel with nitrogen 3 to 5 times before the introduction of hydrogen at high pressure, (~2000 psi). The vessel may be fitted with electrically actuated solenoid valves that are controlled with a PLC system for automatic gas delivery and venting.

Although not necessary in all embodiments, the present exemplary embodiments 100 and 200 may include cooling blocks 130 and 230 respectively. The cooling blocks 130 and 230 are located between the heated portion of the tube vessel, and the end of the vessel, on both sides of the heated portion of the vessel. Their exact length and precise location may vary to suit the process. The cooling blocks 130 and 230 are made from aluminum or other thermally conductive material and are designed to clamp onto the outside diameter of the outer portions of the cooling tubes 104 and 204. The design of the clamp mechanism would be similar to the designs used for the heating blocks 112 and 212. The cooling blocks 130 and 230 may be helpful in in-line production applications, where heating cycles are repeated frequently and residual heat increases the temperature of the entire vessel.

The cooling blocks 130 and 230 contain a series of holes or channels 132 and 232 that allow cold fluid to be pumped through them. The fluid pressure and temperature may be controlled via a programmable logic control system 114 and 214. The cooling blocks 130 and 230 are concentric collars or blocks that clamp on or that slide over the hydrogen vessel cooling chambers 104 and 204. In alternative embodiments, the cooling blocks may be made in two halves and clamped onto the tubes 104 and 204, or made as a single slot collet design that clamps onto the outside diameter of cooling tubes. In the present embodiment, the length of the cooling blocks 130 and 230 is 7.6 cm (~3 inches) each, but could be of different length, as long as the fiber coating is prevented from combusting or degrading.

Figure 3:
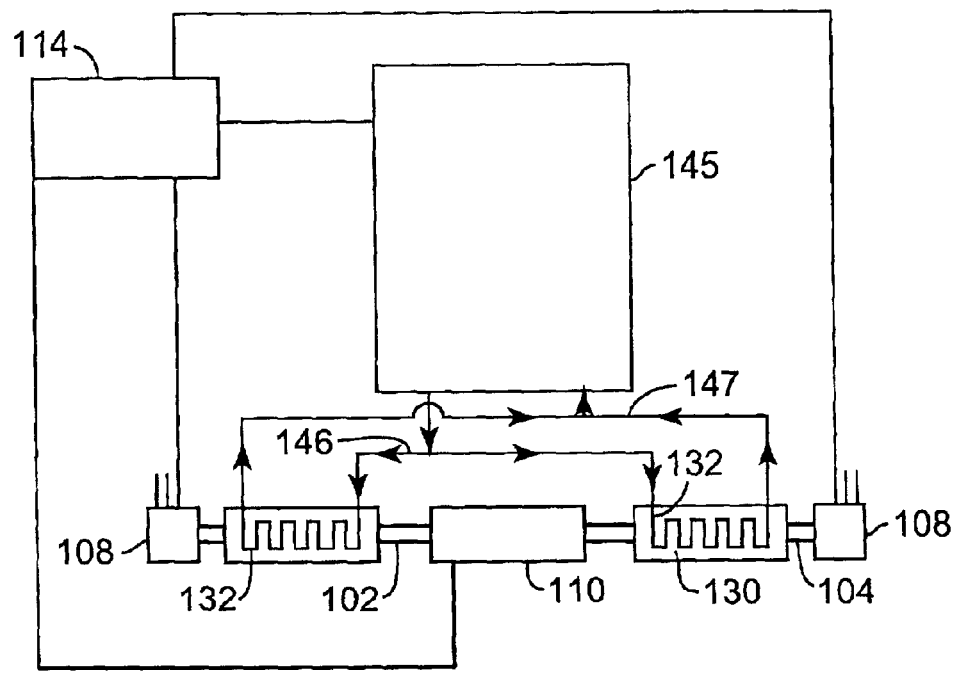
FIG. 3 is a schematic view of a coolant circulation system for the embodiment of a hydrogen loading apparatus depicted in FIG. 1 or 2.

FIG. 3 shows a convenient assembly creating cooling regions near the heating region, in order to minimize damage to the optical fiber coating outside the selectively hydrogen loaded portion of the optical fiber. The exemplary diagram will be shown in reference to the first embodiment of the invention, shown in FIG. 1, but the same principles can be readily applied to any of the embodiments disclosed here. The optical fiber segment 140 (not shown) is enclosed in a tube comprising a central heating tube 102 between cooling tubes 104. Hydrogen gas in introduced into the tubes with the fiber, and the outer ends of the cooling tubes 104 are sealed with closure fittings 108. A heater block 110 is clamped around heating tube 102 to form the heating region. Along the tube at each side of the heating block 110 is attached a cooling block 130 which encloses within its body one or more cooling fluid channels 132. The cooling fluid channels 132 can be connected by external plumbing to a commercial water chiller or other liquid cooling device 145 One exemplary cold fluid recirculation system is a Polyscience Model 5005 Mini-Chiller, which is a commercially available fully contained system that can regulate temperatures to +/−0.5 degrees C. and ranges in programmable temperature settings between −5 to +50 degrees C. Preferably, the cooled fluid outlet 146 of the chiller is connected to the end of cooling fluid channel 132 that is closest to heater block 110. The other end of cooling fluid channel 132 is connected to the warm fluid inlet 147 of the chiller 145. This arrangement causes that the coldest cooling fluid be directed nearest the heater block. This produces a steep temperature gradient between the heating block and the cooling blocks along the tube 104/102 which encloses the fiber that is being hydrogen loaded. The steep temperature gradient helps protect the coating on the fiber outside the hydrogen loading region. Programmable logic controller 114 can coordinate the entire loading process by controlling the temperature of the heating block 110, the temperature and pressure of the cooling fluid in the cooling blocks via the chiller 145, and the input and venting of hydrogen and purge gasses through valved end caps 108

The vessels 100 and 200 allow a length of fiber 140 and 240 to be inserted into the cooling and heating tubes, while allowing additional room to move the fiber 140 and 240 once inside the tube vessel. In this embodiment, fiber segments no longer than the length of the vessels are inserted and removed from the tube by removal of one of the fittings located on the end of the tube vessel, which allow insertion or extraction of the fiber, or fibers, into or out of the vessel.

The extra length of the tube vessel (e.g., 105 cm.) as compared to the target fiber length (e.g., 90 cm.), allows the fiber to move inside of the tube a distance that is greater than the heated length of tubing, (which is 5 cm. in this case), to provide a rapid transition of temperature within the fiber from hot to cool, in the heat affected zone. A rapid transition from the heated area to a cooled area slows the diffusion of hydrogen out of the fiber when loading gas pressure is released.

A variety of mechanisms may be implemented to effect this movement. In the embodiment illustrated in FIG. 1, a magnetic body 116, such as a magnetic or ferrous ring, is attached to a portion of the fiber 140. By translating a magnet 118, having a sufficient magnetic force, along the outside of the tube in the axial direction of the tube thus moving the fiber inside of the tube. Another method would involve attaching a weight 216 onto the end of the fiber and tilting the tube, which will cause the weight, and attached fiber to move due to gravitational forces, towards the lower end of the tube.

Following are descriptions of exemplary processes that may be utilized to load hydrogen into an optical fiber using the vessel 100. The term hydrogen atmosphere in the present description is intended to include atmospheres including $H_2$, $D_2$, tritium, or molecules such as HD that combine these isotopes of hydrogen. The first process comprises the step of inserting (threading for non-clamping tubes) the optical fiber 140 into the vessel 100, and sealing the vessel 100. Several cycles of nitrogen, introduced through the gas inlet 120 and exhausted through the gas vent 122, are purged through the vessel 100 to ensure that ambient air has been evacuated from the vessel 100. Hydrogen is introduced, exemplarily at high pressures, such as between 1000 to 2000+ psi.

Preferably after full pressure is reached, the heating block 110 would be activated. The programmable logic control system 114 controls the temperature in the chamber by controlling the heating blocks. In applications where considerable heat may migrate into other portions of the fiber, the cooling blocks 130 also may be activated.

For high-temperature loading processes, in one exemplary process, the portion of the fiber 140 to be loaded is stripped of its coating prior to insertion into the vessel 100. In yet another embodiment, the fiber includes a high-temperature resistant, hydrogen-permeable coating suitable to resist the loading temperature.

In yet another alternative method, the coating may be selected such that it depolymerizes into gaseous products at or below high loading temperatures. The hydrogen atmosphere preferably is selected to not include oxygen, in order to avoid an oxidation/combustion process. The resulting gases are vented out of the chamber with the heated hydrogen. This allows for both loading and stripping of the coating in one step. Additional detail regarding depolymerizable coatings may be found in commonly assigned U.S. Pat. No. 5,939,136, "Process For Preparation Of Optical Fiber Devices Using Optical Fibers With Thermally Removable Coatings", and commonly assigned U.S. Pat. No. 5,596,669, "Radiation Curable Coating Composition And Coated Optical Fiber", which are hereby incorporated by reference.

When the hydrogen atmosphere reaches the desired temperature, a timer would be started to track the time the fiber 140 is exposed to the heated hydrogen atmosphere. Co-assigned U.S. Pat. No. 6,311,524, which is hereby incorporated by reference, describes exemplary exposure and temperature settings for high-speed, high-temperature hydrogen loading. U.S. Pat. Nos. 5,235,659 and 5,287,427 offer examples of other hydrogen loading parameters.

After a desired exposure time is reached, the heating blocks 110 are deactivated. Depending on factors such as loading requirements or the heat sensitivity of the coating of the fiber, the fiber may be immediately moved to the cooling tube 104. Hydrogen pressure may be vented and nitrogen or other inert gases may be forced into the vessel 100. The vessel 100 is opened and the fiber 140 removed.

A grating may be then written by exposing the selected portion to a pattern of actinic radiation. The selected portion may then be annealed. If a coated fiber was used, with sectional loading, only the loaded portion, which is the same portion that the grating is written on, will require recoating. No hydrogen bake out is required with sectional loading, as with bulk-loaded fiber, as the annealing process step removes hydrogen from the loaded area.

In a method in accordance with the present invention, the above steps may be performed in a step in-line process. The fiber may be suspended in a reel to reel assembly, threaded through an optional coating removal station, a hydrogen loading station, a grating writing station, an annealing station, and an optional recoating station.

The second exemplary process is similar, but differs at one point. The method again comprises the step of inserting the fiber 140 into the vessel 100, and sealing the vessel 100. Several cycles of nitrogen are forced through the vessel to ensure that ambient air has been purged from the vessel 100. The heating block 110 (and cooling blocks 130 if required) are activated to achieve the desired temperature. After the nitrogen atmosphere reaches the desired temperature, nitrogen is replaced by hydrogen, which may be introduced at high pressures, such as between 1000 to 2000+ psi. Since the mass of the inserted hydrogen is very small with respect to the mass of the vessel, the hydrogen would very quickly reach the desired temperature.

In yet another, third, exemplary process, the hydrogen is preheated in a second pressure vessel prior to introduction into the "tube" type vessel. A pre-heating chamber may even be used to heat the hydrogen atmosphere prior to introducing the hydrogen atmosphere into a loading chamber having no heating element. The hydrogen may be preheated to the same desired temperature to manage any "heating lag". Alternatively, the hydrogen may be preheated to a lower temperature (to reduce the heating time, yet to allow ease of handling when the desired temperature is high) or even at a higher temperature to compensate for expected heat loss upon insertion.

When the desired pressure and/or temperature is reached, a timer tracks the time the fiber 140 is exposed to the hydrogen atmosphere. After this predetermined time is reached, the heating blocks 110 are deactivated. Again, if desired, the fiber 140 may be immediately moved to the cooling tube 104. Even while the fiber 140 is being moved to its new position, hydrogen pressure may be vented, and nitrogen or another inert atmosphere may be forced into the vessel 100 to displace and purge any remaining hydrogen. After the purge, the vessel 100 may be opened and the fiber 140 removed. In alternative process flows, if safety and equipment permits, the fiber may even be removed immediately after the end of the loading process (e.g., for applications using low temperature and small volumes of hydrogen).

Figure 4:
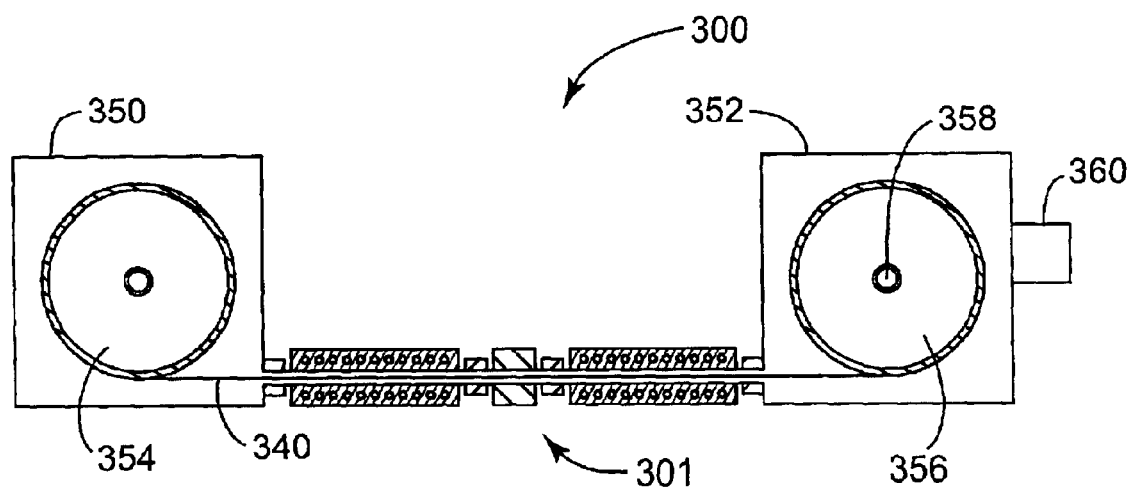
FIG. 4 is a side cross-sectional elevation view of a third embodiment of a hydrogen loading apparatus in accordance with the present invention.

FIG. 4 is a schematic illustration of a reel-to-reel production assembly 300. The production loading assembly 300 includes a middle-loading vessel 301 including similar features to vessels 100 and 200. The assembly 300 further includes a fiber unwind reel 350 and fiber wind up reel 352. Each reel includes a spool, an unwind spool 354 and a wind up spool 356 respectively. The rotation of the wind up spool or both of the spools is actuated by a spooling motor, such as electric servo motor 358. A programmable logic controller (PLC) 360 may be electronically coupled to the motor 358 to control the entire process.

The process of loading an optical fiber using the assembly 300 comprises loading a length of fiber 340 into the unwind reel 350. The fiber 340 is threaded through the tube vessel 301 and attached to the wind up reel 352. The loading process is similar to the ones described above; with the addition that timing and precise fiber advancement occurs automatically via programmed predetermined recipes or inputs monitored by the PLC 360. With this apparatus, multiple sections of a longer continuous length of fiber may be hydrogen loaded, reducing the amount of labor, and increasing the consistency of the hydrogen loading process. If desired, the assembly 300 may further include marking stations that identify—such as by visible markings, different coatings, and/or machine-readable codes—the areas that were hydrogen loaded. If desired, a grating may then be written in the hydrogen-loaded area.

Figure 5:
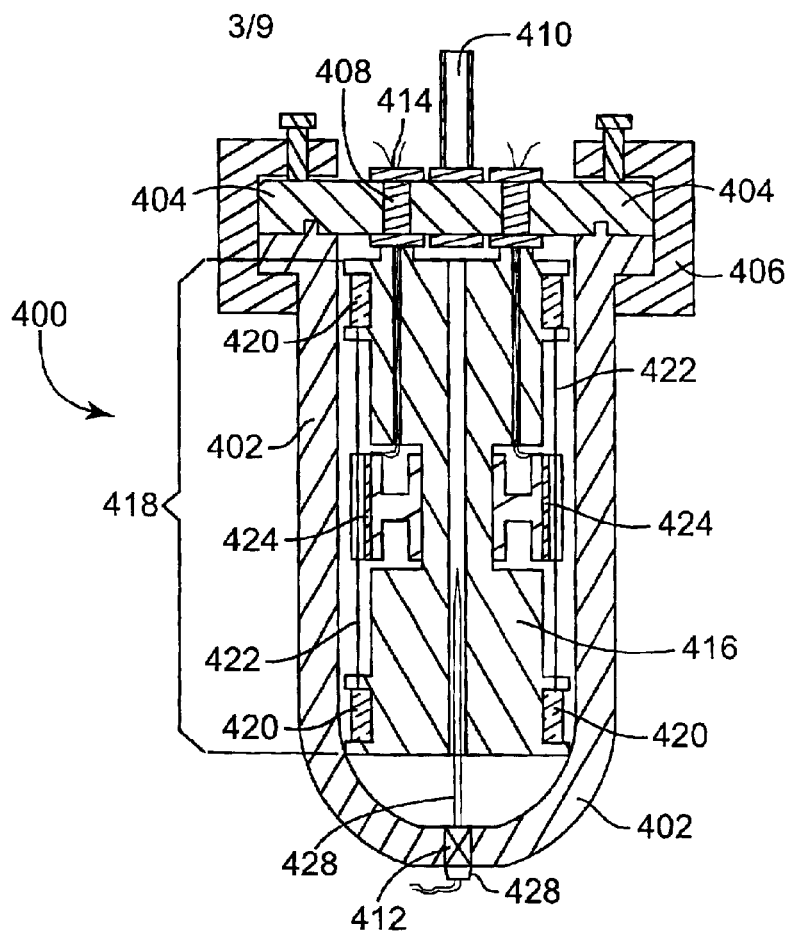
FIG. 5 is a longitudinal cross-sectional view of a fourth embodiment of a hydrogen loading apparatus in accordance with the present invention.

FIG. 5 illustrates a fourth embodiment 400 of a high temperature hydrogen-loading vessel. FIG. 5 illustrates a cross section of the vessel 400 cut through its axial centerline (the vessel is in the shape of a cylinder). The vessel 400 includes a cylindrical bell-shaped body 402 capable of withstanding high-temperatures and internal pressures. A vessel cap 404, secured to the body 402 by vessel clamps 406 closes the open end of the body 402. The vessel cap 404 includes four pass-through ports 408 for a gas inlet/vent 410, and for electrical control ports 414. The electrical control ports are coupled to a programmable heater control system, which may be used to control several electric cartridge heaters inside of the loading vessel. The bottom of vessel 400 includes a thermocouple port 412, A fiber spool assembly 416, made of a material able to resist the high temperatures, and conduct thermal energy quickly, such as aluminum, is placed inside of the body 402. The aluminum fiber spool assembly 416 of the present embodiment includes a number of optical fiber receiving stations 418. The present embodiment holds about ten (10) stations, which would allow for ten fiber segments to be sensitized. Each station includes two individual fiber reels 420 that retain one optical fiber segment 422. The fibers are wrapped around the outside diameter of each reel 420 and are held in position with flanges that extend beyond the diameter of the reel. A precise curved slot is milled into the flanges, (on both the top and bottom reels), that are located on the flange that is positioned closer to the center of the aluminum fiber spool, and allow the fiber 422 to be routed off of the storage reel diameter.

Each station also includes a heater block 424 located at about the midspan portion of each fiber segment 422. The fiber is routed out of the upper storage reel and back into the lower storage reel. Between the two storage reels, it is positioned parallel to the axis of the aluminum fiber spool, and passes through a heater block that is located in the center of the spool.

The aluminum fiber spool assembly 416 is attached to the vessel cap 404 where the electrical wire pass-through ports 414 are located. This attachment allows for easier insertion and removal of the spool assembly 416, and provides wire bend protection to the electrical wires. A thermocouple 428 passes through the thermocouple port 412 and monitors the temperature of the spool assembly.

Figure 6:
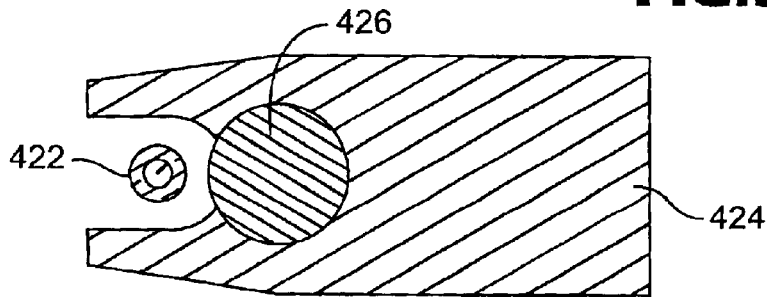
FIG. 6 is a plan cross-sectional detail view of a heater block and fiber of the loading apparatus depicted in FIG. 5.
Figure 6:
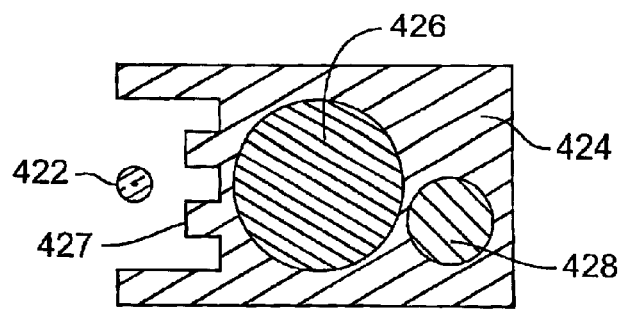

FIG. 6a illustrates a cross sectional view, (looking from top to bottom) of the fiber 422 passing through a U shaped channel that is cut into the heater block 424. In the present embodiment, the heater block 424 holds an electric resistance cartridge heater 426, where approximately 60 degrees of the heater body is exposed in the bottom of the U shaped channel. This exposed portion of the cartridge heater 426 provides extremely quick temperature ramps of the atmosphere that intimately surrounds the fiber 422 in this U shaped channel.

FIG. 6b illustrates a second design of the heater block 424 having the cartridge heater 426 fully embedded in the heater block 424. The outer portion of the heater block 424 has several ribs 427 milled into it to dissipate the heat in a more efficient manner. In addition to thermocouple 428, individual thermocouples monitors the temperature of each heater block 424, touching the heater 426, to provide temperature signals for a PLC that would provide precise temperature regulation of the heater 426. Additional thermocouples may be added to the aluminum spool, positioned in an orientation to monitor hydrogen temperature.

Following are exemplary processes that may be utilized to load hydrogen into an optical fiber using the vessel 400. The first comprises the steps of installing a length of fiber 422 onto the aluminum fiber spool assembly 416, inserting the spool assembly 416 (which is attached to cap 404) into the vessel body 402, and sealing the vessel 400. Again, in high-temperature processes, the fiber 422 may be pre-stripped or include high-temperature or gaseously depolymerizable coatings.

Several cycles of nitrogen are purged through the gas inlet/vent 410 to ensure that air was evacuated from the vessel 400. For high-pressure recipes, hydrogen is introduced at high pressures, between 1000 to 2000+ psi. Depending on the type of fiber used, and the type of grating that is being written, pressures between 500 psi and 2100 psi may be used. Higher pressures (~3000 psi) would allow more hydrogen to diffuse into the fiber, and might be desirable for some applications. The heaters 426 are activated, preferably after full pressure is reached. When the hydrogen atmosphere reaches the desired temperature around the fiber (as measured by the thermocouple), a timer tracks the time the selected portion of the fiber 422 is exposed to the high-temperature hydrogen atmosphere.

After the selected time is reached, the heaters 426 are deactivated, and the exposed portion of the fiber 422 is allowed to cool. Hydrogen pressure is vented and nitrogen or other suitable gases are forced into the vessel. In one exemplary embodiment, chilled nitrogen is forced into the vessel to cool the fiber and coatings and to reduce the diffusion rate of the hydrogen out of the optical fiber due to the venting of the hydrogen pressure. The vessel 400 is then opened, the aluminum fiber spool assembly 416 removed, and the fiber segments 422 removed from the fiber spool assembly 416.

In certain embodiments, the optical fiber receiving stations 418 are cartridges, such as those described in co-pending and commonly assigned application U.S. Ser. No. 09/804,781, "Filament Organizer", U.S. Ser. No. 09/841,015, "Carrier For Coiled Filaments", or U.S. Ser. No. 09/907,406 "An Apparatus For Holding And Protecting Several Precision Aligned Optical Fibers", which are hereby incorporated by reference. In these embodiments, the entire cartridge is removed from the fiber spool assembly 416.

The second exemplary process is similar to the first, but different at one point. It again includes installing the fiber segments 422 (or fiber holding cartridges) onto the fiber spool assembly 416, inserting the spool assembly 416 into the vessel body 402, and sealing the vessel 400. The vessel 400 is purged by several cycles of nitrogen to ensure ambient air has been evacuated. At this point, the heater cartridges 426 are activated. When the nitrogen atmosphere around the fiber segments 422 has reached the desired temperature, the nitrogen is purged and replaced by hydrogen. It must be understood that in this and other example, the term hydrogen means $H_2$, $D_2$, or other isotopic molecules of hydrogen and/or one or more gases, preferably inert gases, with $H_2$ and/or other isotopic hydrogen species. It is preferable to avoid the use of oxygen to avoid an oxidization/combustion reaction.

The hydrogen is introduced, exemplarily, at high pressures between 1000 to 2000+ psi. Again, in an alternative embodiment the hydrogen may be pre-heated. A timer tracks the time the fiber segments 422 are exposed to the high temperature, high-pressure hydrogen atmosphere. Due to its low mass in relation to the heater block, the hydrogen almost immediately reaches the desired loading temperature. When a predetermined exposure time is reached, the heaters are deactivated. Exposure time may be calculated using the equations found in U.S. Pat. No. 6,311,524.

The hydrogen gases may be vented, and nitrogen or another inert gas may be forced into the vessel. Again, the purge gas may be cooled or chilled. As soon as the hydrogen pressure is released, hydrogen will begin to diffuse out of the fiber. The rate of diffusion is a function of temperature. The vessel may then be opened, the fiber spool assembly 416 removed, and the fiber segments 422 (or fiber cartridges) removed from the spool assembly 416.

FIGS. 7–13 illustrate a fifth high temperature hydrogen-loading vessel embodiment 500. The vessel 500 uses a unique split vessel design, where the chamber that retains the high-pressure hydrogen at high temperatures is made in two halves.

Figure 7:
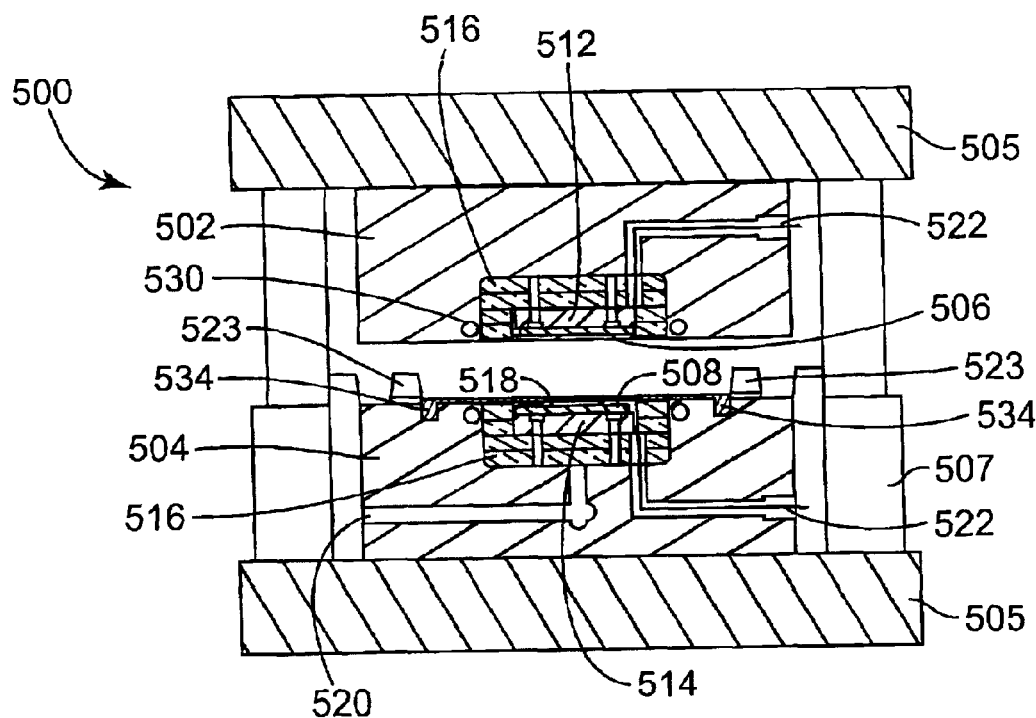
FIG. 7 is a cross-sectional elevation view of a fifth embodiment of a loading apparatus in accordance with the present invention in an open position.
Figure 8:
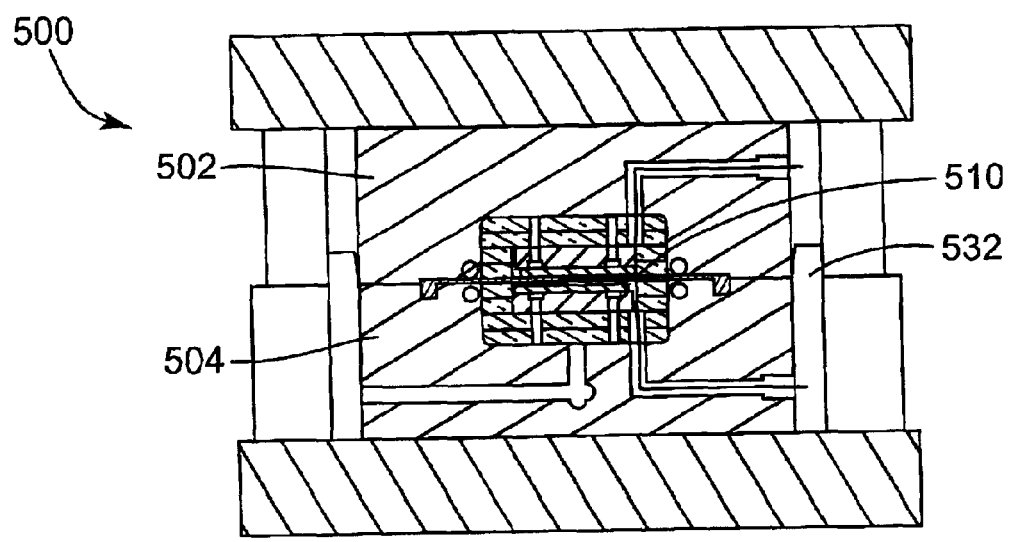
FIG. 8 is a cross-sectional elevation view of the apparatus depicted in FIG. 7 in a closed position.
Figure 14A:
FIG. 14 is a cross-sectional elevation view of a third embodiment of a clamping/sealing mechanism for the vessel illustrated in FIG. 7.
Figure 14B:
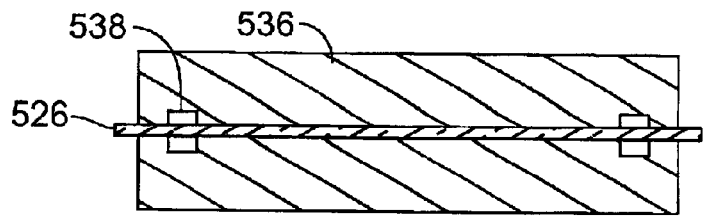
Figure 14C:
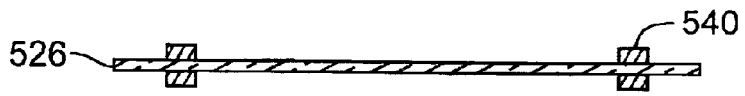
Figure 14D:
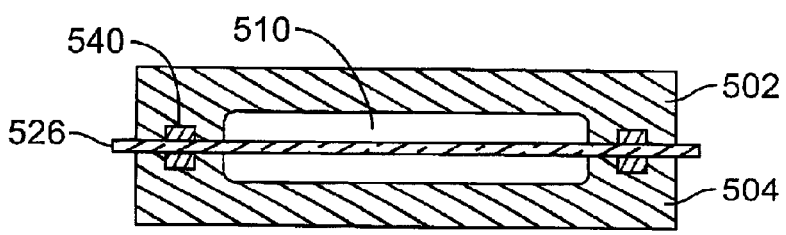
Figure 14E:
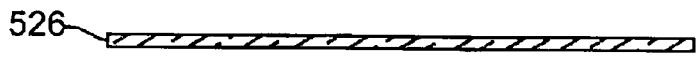
Figure 14F:
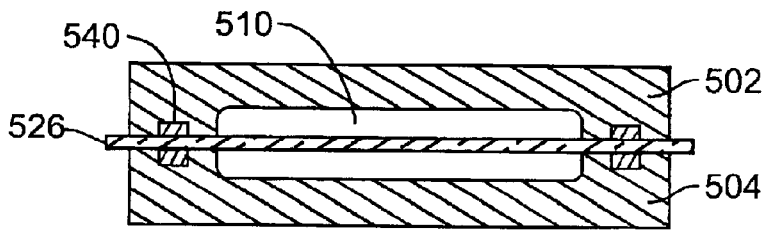

The open position of vessel 500 is illustrated in FIG. 7 and the closed position in FIG. 8. The primary vessel halves are the upper vessel block 502 and the lower vessel block 504. In the present embodiment, the blocks 502 and 504 are made from soft 400 series stainless steel and are annealed after machining. Both the blocks 502 and 504 have pockets, upper pocket 506 and lower pocket 508 respectively, in their center areas. When closed, as shown in FIG. 8, the pockets form a loading chamber 510.

In the present embodiment, the blocks 502 and 504 are fastened in a precision lamination grade preloaded ball bearing precision die set 505 to ensure precise block alignment and parallelism during operation. The die sets 505 are fastened into a hydraulic press 507, that generates enough compressive force to keep the two blocks 502 and 504 sealed when the vessel 500 is pressurized with hydrogen, and can open the vessel blocks 502 and 504 wide enough to allow easy insertion and removal of optical fibers 526 between cycles.

FIGS. 9 and 10 illustrate enlarged cross sectional views of the hydrogen-loading chamber 510, and the heating blocks, respectively. The enlarged views illustrate the small volume of loading chamber 510 in greater detail. Heater blocks 512 and 514, surrounded by ceramic insulation 516 are each placed inside one of the pockets 506 and 508 in vessel blocks 502 and 504, respectively. The insulation 516 helps to separate the hot loading zone from the rest of the optical fiber to reduce the possibility of damage to the polymer coating of the fiber. Each heater block 512 and 514 includes one or more heaters 518, such as electric cartridge heaters. The optical fiber 526 spans the center portion of the loading chamber 510 and is axially positioned between the two cartridge heaters 518 in the loading chamber. As illustrated in FIG. 10, the cartridge heaters 518 are in close proximity to the fiber 526 and provide fast heating of the surrounding gas and the fiber 526.

The vessel blocks 502 and 504 include a gas inlet/vent port 520 to supply and purge gases into the loading chamber. The gas inlet/vent port 520 may also be used as a wire channel to route control and data connections. Alternatively, a second set of ports 522 may be used to allow electrical and thermocouple wires to route to the heaters 518 and one or more thermocouples 528 in the loading chamber 510. As better seen in FIG. 11, the opposing faces that come into contact of the upper and lower blocks 502 and 504 have a radial groove cut 524 down the x-axis centerline that is used to position and seal around a fiber 526 to be sensitized. Two guide pins 523 that match openings in the opposite vessel block provide precise final alignment of the two blocks 502 and 504 as they come together to make a seal.

In certain circumstances, such as in very high heat applications, or where repeated use of the vessel caused heat buildup (e.g., in an in-line application), the vessel blocks 502 and 504 may include liquid cooling lines 530. The cooling lines 530 are positioned along the y-axis near the top edge of the center pockets 506 and 508 and are used to keep the fiber polymer coating 527 cool during loading. The cooling lines help to minimize the risk that the polymer coating 527 in non-loaded portions of the optical fiber 526 remains below the temperature that would cause degradation or oxidation.

Several fiber guide plates 532 are fastened on the left and right sides of the lower vessel block to provide guidance of the fiber into the radial sealing grooves. An optional elastomer face seal 534 may be used on the vessel block contact faces to reduce the possibility of gas leakage during loading.

FIGS. 11 and 12 illustrate two alternative ways to seal around the fiber 526 as it enters and exits the loading chamber 510. The fiber 526 has a coating 527 surrounding a glass center portion 529. In the embodiment illustrated in FIG. 11, referred to as the "steel on steel clamping method", the pair of precision machined radial grooves 524 traverse down the x-axis centerline of the blocks 502 and 504. The radius of the groove 524 is slightly smaller (e.g., several ten thousands of a centimeter), than the radius of the coating 527 of the fiber 526. An interference-fit between the groove 524 and the fiber 526 causes the coating 527 to compress slightly when the two vessel halves are brought together, creating a tight seal between the fiber 526 and the grooved vessel surfaces. The glass portion 529 of the optical fiber 526 remains undamaged. The outside surface of the coating 527 may be compressed due to the compressive forces applied, but this should not cause optical performance problems.

FIG. 12 illustrates a "seal-on-seal clamping method". The method may be used with coated optical fibers as well as with bare glass optical fibers having no polymeric outer coatings. The embodiment includes elastomer seals 534 installed into the faces of both vessel blocks 502 and 504 (the elastomer seals cross section are not necessarily drawn to scale). As the vessel faces are brought together under hydraulic force, the elastomer material compresses around the optical fiber coating creating a tight seal. The top surface of the elastomer seals may be pre-molded to have a groove adapted to fit the optical fibers, similar to that shown at 524 in FIG. 11, in order to obtain a better seal along the lines where the sides of the fiber 526 and the upper and lower elastomer seals 534 meet upon application of hydraulic force.

FIG. 13 is a top plan view of the lower vessel block 504. This view more clearly shows the optical fiber path in the center of the vessel blocks x-axis upper surface. The fiber guides 532 outboard of the block edges provide coarse alignment of the fiber 526 to the radial grooves 524 that are machined into the vessel block 504 upper face. The heater block 514 with surrounding ceramic insulation 516 is centered in both axes in the center of the vessel block 504. Bolt holes 531 are machined in the y-axis very close to the point where the optical fiber 526 intersects the loading chamber 510. The two guide pins 523 are located on opposite corners of the block 504 to provide precise final alignment of the vessel blocks 502 and 504 before clamping occurs around the optical fiber 526. The elastomer seal 534 is positioned to minimize or eliminate gas leakage during the loading process.

FIG. 14 shows a cross-sectional elevation view of a third embodiment of a clamping/sealing mechanism for the vessel illustrated in FIG. 7. The section of optical fiber 526 that is to be hydrogen loaded is placed in an injection mold 536 that forms typically a pair of mold cavities 538. These mold cavities 538 match the cavities in upper vessel block 502 and lower vessel block 504 that are adapted to receive the elastomer seals 534, as shown in FIG. 13. A curable seal material (typically an elastomer) is then injected into the mold cavities and cured around the fiber, forming molded seals 540 on fiber 526. The fiber is then removed from the injection mold and positioned on lower vessel block 504, with the molded seals on the fibers fitted into the cavities adapted to receive elastomer seals 534, as in FIG. 13. Upper vessel block 502 is then brought into contact with lower vessel block 504 and pressed to form a seal around fiber 526 and molded seals 540, in preparation for hydrogen loading of the fiber. Alternatively, molded seals 540 may be produced in place, using upper and lower vessel blocks 502, 504 as the injection mold and curing the seal material in situ. Curing may be accomplished during pre-heating of the hydrogen loading cavity, before high pressure is applied within hydrogen loading cavity 510. As shown in FIG. 13, the cavity for holding elastomer seals 534 or 540 may be separated from heater block 514 by hydrogen loading cavity 510 and ceramic insulation 516, which is cooled by liquid cooling lines 530, so the elastomer will not be damaged by the very high temperature of hydrogen loading cavity 510 during the loading cycle.

Following are different exemplary processes that may be utilized to load hydrogen into an optical fiber 526 using this vessel 500. The first process includes the step of locating the fiber 526 onto the fiber channel/groove 524 on the face of the lower vessel block 504. The blocks 502 and 504 are then clamped, such as by the use of hydraulic pressure. Several cycles of nitrogen may purge the loading chamber 510 to evacuate ambient air.

Hydrogen is then introduced. Again, the vessel 500 is designed to handle high pressures. Depending on the type of fiber, the concentration of hydrogen or deuterium in the inserted loading atmosphere, the desired index change, pressures between ~500 psi and ~2,200 psi have been experimentally used. The chamber is designed to withstand pressures up to 3,000 psi. Higher pressures are possible depending on the design and manufacture of the vessel. The present exemplary method uses pressures between 1,000 to 2,000+ psi. After full pressure is reached, the heaters 518 are activated. When the hydrogen atmosphere reaches the desired temperature around the fiber 526, a timer tracks the time the fiber 526 is exposed to the high-temperature hydrogen atmosphere. After the desired time exposure, the heaters 518 are deactivated. Hydrogen pressure could be vented and nitrogen or another suitable inert gas (cooled or otherwise) may be forced into the loading chamber 510, the vessel 500 opened, and the fiber 526 removed. Another option for the fiber removal cycle would be to open the vessel 500 right after the time had been reached while the vessel was still pressurized, enacting instant venting of the hydrogen, and cooling of the fiber, which would ensure maximum hydrogen content in the fiber. The volume of the vessel is so small that this procedure should be safe with reasonable precautions, such as minor shielding around the vessel.

The volume of an experimental loading chamber, such as the one illustrated, was 0.3125 square inches (2.02 cm$^2$) not including the gas feed holes drilled in the block, or the piping outside the block. The total gas volume for an optimized single fiber loading station could be as low as 0.15 square inches (0.97 cm$^2$). The final configuration of the vessel will dictate the total gas volume.

The average time it took for the electric cartridge heaters to reach the temperature set point, (275° C.), was 45 seconds, +/−3 seconds. The time it took for the hydrogen gas to reach the desired set point, (260° C.), depended on the pressure used. At pressures between 1400 psi and 2000 psi, the time was between 1.5 to 2 minutes. At pressures between 1100 psi and 1400 psi, the time was between 3 to 4 minutes.

Coating delamination did not occur during any of the experimental runs. Bulk delamination does not occur due to the sectional pressurized zone in the two-piece vessel.

In the second exemplary process, generally the same steps are followed, with the exception that the hydrogen is introduced into the preheated loading chamber 510. While the small mass of the gas volume of the chamber 510 compared to the mass of the heating blocks will lead to rapid heating, in alternative embodiments, the hydrogen may even be preheated to or nearly to the desired temperature.

If the fiber is written on soon after the fiber is loaded, it will not require cold storage. Any hydrogen loaded fiber, no matter the method of loading, will slowly diffuse hydrogen out of the fiber over time at room temperature. The advantage with sectional loading of fiber, as compared to bulk loading, depends on the amounts of fiber that has been loaded. With the speed of high temperature sectional loading, one may load only the correct amount of fiber that is to be written in a specific time period. With the long cycle time of bulk loading, this becomes more difficult.

Figure 15:
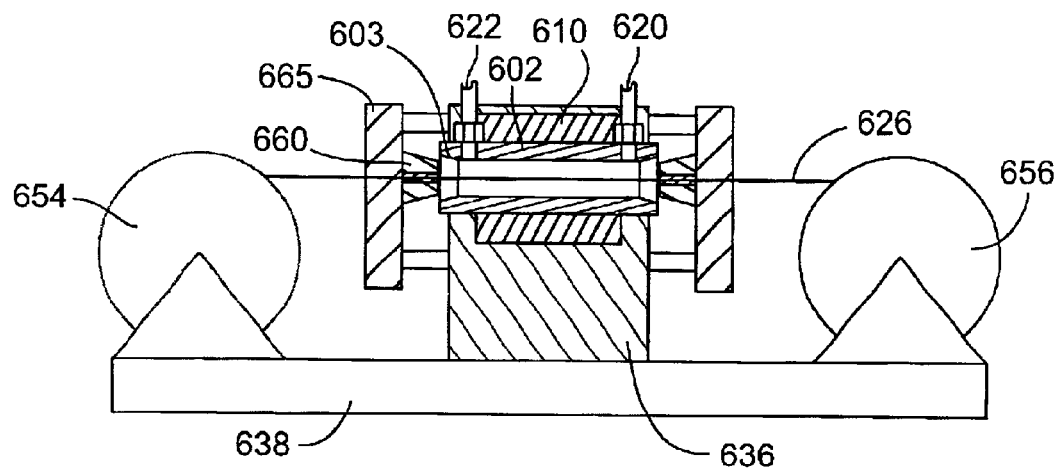
FIG. 15 is a side cross-sectional view of a sixth embodiment of a hydrogen loading apparatus in accordance with the present invention.
Figure 16:
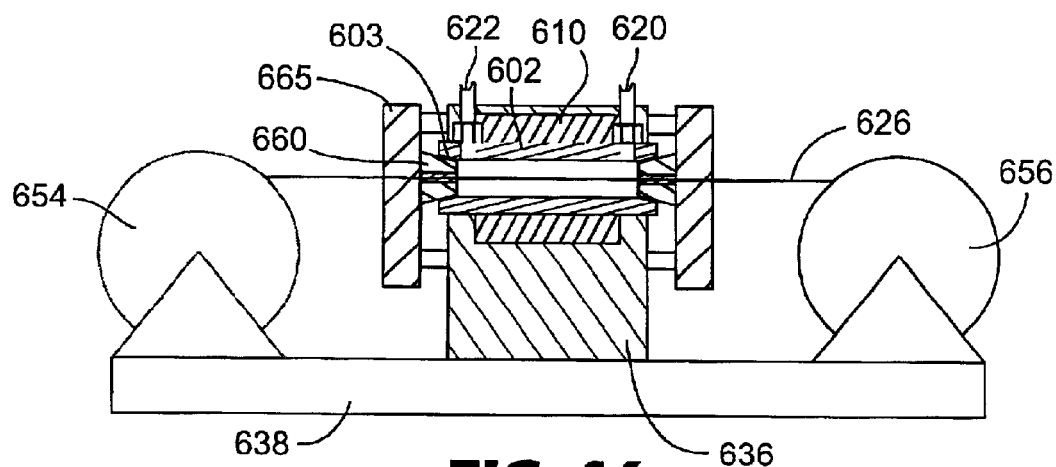
FIG. 16 is a side cross-sectional view of the apparatus depicted in FIG. 15 in the closed position.
Figure 17A:
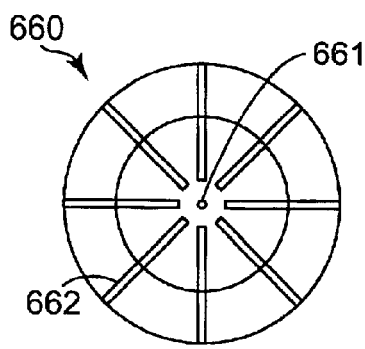
FIG. 17 is an end view and cross-sectional end view of the collet depicted in FIG. 15.
Figure 17B:
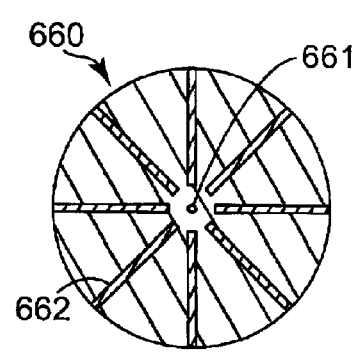

FIGS. 15–17 illustrate a sixth high temperature hydrogen-loading vessel embodiment. The vessel uses a unique tubular vessel design, having conformable collets located at both ends of the tube that seal the end of the tube and seal around the fiber that passes through the tube. When the collets have sealed the tube ends, and have sealed around the fiber, the tube will retain the high-pressure hydrogen at high temperatures to enable hydrogen to diffuse into the fiber that is passing through the tube.

The open position of the vessel is illustrated in FIG. 15 and the closed position in FIG. 16. The primary vessel is a cylindrical stainless steel tube or pipe 602 containing a precision angular chamfer 603 at each end, and gas entry (620) and gas vent (622) ports near the end of the tube or pipe. The tube or pipe has a heating jacket 610 surrounding it, and can be heated electrically, or with hot fluids or gasses. The tube or pipe with heater jacket assembly is contained within a main base block 636 that is mounted to a base plate 638.

In the present embodiment, an elastomeric collet 660 is mounted to a collet actuator plate 665 that allows linear motion of the collet plate assembly. The shape of the collet is a truncated cone, where the angle of the cone matches the chamfer 603 in the tube or pipe. The linear motion of the collet actuator plate assembly allows the collet 660 to enter the end of the tube or pipe 602, allowing the angular surface of the collet 660 to seal against the angular surface of the chamfer 603 in the tube or pipe 602. It also allows the collet 660 to be withdrawn from the tube or pipe 602. Movement of the collet actuator plate 665 is accomplished with hydraulic cylinders attached to the plate. These are not shown, but can be attached by several means, including bolts, pins, etc., in several configurations, pushing or pulling. Air cylinders could be substituted. Electric or mechanical actuators could also be used.

The elastomeric collet 660 illustrated in end view, and cross section end view in FIG. 17, has a small hole 661 in the center, which is 10% to 20% larger than the outside diameter of the coated fiber that is to be loaded. There are eight rectangular shaped stainless steel ribs 662 that are spaced in a 45-degree radial orientation about the center hole. As the collet 660 is forced into the tube or pipe 602, the angular surface of the collet rib 662 will contact the angular surface of the chamfer 603 on the end of the tube or pipe 602, transmitting this force to the elastomer material surrounding the fiber 626, creating a seal between the elastomer and fiber. When the collet 660 is extracted from the tube or pipe 602, the elastomer material returns to its stress free state, allowing the hole 661 to open to its original size, freeing the fiber 626. The elastomeric collet thus provides a re-closable seal around the optical fiber that helps contain the hydrogen atmosphere during the loading process. This re-closable seal can be re-opened to remove the fiber and, optionally, to advance the fiber, re-seal, then hydrogen load a second selected portion of the same fiber. (The sealing mechanisms in FIGS. 7, 11, and 12 would also be considered re-closable seals.)

A wind-up (656) reel, (driven by a programmable electric motor/encoder or servo system), in which rotation of the motor is precisely controlled, provides accurate linear lengths of fiber to be transported through the chamber 602 at the desired time. There is also an unwind (654) reel, that may be used in conjunction with a brake of clutch, (which could be actuated with air, magnets, electricity, fluids, etc.), to provide precise tension on the fiber as it is transported into and out of the chamber 602. The process cycle would include the following steps:

Transport unloaded fiber into the tube or pipe, to the desired spacing.

The collet actuator plates position the collets into the ends of the tube or pipe, sealing the vessel, and creating a seal around the fibers.

The vessel is purged with nitrogen or other suitable gases.

The vessel is pressurized with hydrogen (the heaters are already hot).

The fiber is kept at pressure the desired amount time.

The hydrogen is vented, and the vessel is purged with nitrogen.

The collet actuator plates are retracted.

The fiber is advanced.

Optionally, the newly-loaded section of optical fiber may have a Bragg grating written into it, and the grating may be optionally annealed.

If the coating has been stripped off the loaded section of fiber by the high-temperature loading process, the stripped section may optionally be recoated before it reaches the wind-up reel.

Figure 18:
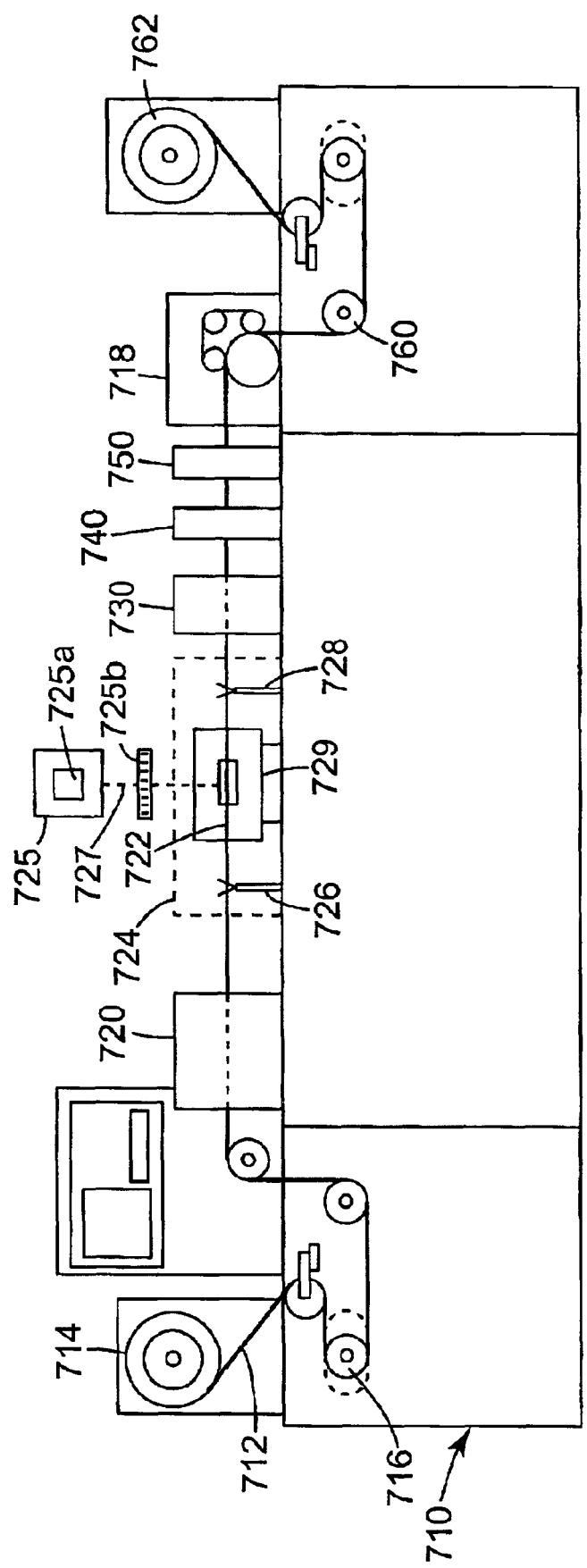
FIG. 18 is a sequential step illustration of methods for increasing the photosensitivity of an optical fiber in accordance with the present invention.

FIG. 18 shows a sequential step illustration of methods for increasing the photosensitivity of an optical fiber in accordance with the present invention, and for writing one or more gratings in an optical fiber. This figure corresponds to FIG. 1 in co-assigned U.S. Pat. No. 6,272,886 B1, "Incremental Method Of Producing Multiple UV-induced Gratings On A Single Optical Fiber", which is hereby incorporated by reference. An embodiment of the present invention that has a re-closable seal, such as those shown in FIG. 7 or 15, can be substituted for coating removal station 20 in the fiber grating manufacturing apparatus and process shown in U.S. Pat. No. 6,272,886 B1. This hydrogen loading and (optionally) coating removal station 720 receives fiber 712 from tension-controlled payoff spool 714 and alignment pulleys 716. The fiber is stopped when a selected portion of optical fiber 712 is positioned in hydrogen loading (and optional coating removal) station 720. The hydrogen loading process is then carried out as described above. The hydrogen loaded selected portion 722 of fiber 712 is then advanced by drive capstan 718 to the grating writing station 724, where it is clamped between clamps 726 and 728 during the writing process. After a grating is written in selected portion 722, this portion now containing the grating is advanced to an optional annealing unit 730, where the grating is heated to stabilize its reflectivity. If coating has been removed from the selected portion, the portion may be advanced to an optional recoat material application or packaging station 740, then to an optional recoat curing station 750. The selected portion of fiber 720 containing the grating may then be advanced by means of optional drive capstan 718 and alignment pulleys 760 to a take-up spool 762, for easier handling and shipping. As one selected portion of fiber 722 is advancing through the system, a following second selected portion of the fiber may also be advanced stepwise through the system in an assembly line fashion. Optional slack accumulation stations may be placed between the various processing stations if the spacing between gratings along the single fiber must be varied.

The present invention offers significant advantages. Selective loading allows for only the portion of the fiber that requires gaseous loading to be exposed. Hydrogen loading conventional polymer coated fibers at high temperatures >250° C. may cause combustion or partial destructive depolymerization of traditional coatings. If the fiber is hydrogen loaded with the traditional bulk loading method, the entire fiber will need to be recoated. With sectional loading, only the loaded portion, which is the same portion that the grating will be written on, will need to be recoated.

There is no need for a hydrogen bake out process step with sectional loading, as with bulk-loaded fiber. Being that the length of the fiber where the grating was written, and the sectional loaded area are approximately the same length, the annealing process step removes hydrogen from the loaded area.

A fiber that contains hydrogen cannot be fusion spliced. The hydrogen causes deformation in the glass when exposed to the electric arc, making it impossible to achieve a useable splice. With sectional loading, a fusion splice may be made anywhere outside of the grating area prior to removing hydrogen from the fiber. This may be useful when monitoring the grating during writing, or during a final packaging step. The ability to fusion splice at any point during the manufacturing process increases the flexibility of the processes, and product(s) being made.

Sectional loading of fiber further allows the manufacturer to tailor the photosensitivity of each fiber loaded by precisely controlling the temperature and pressure of the hydrogen, and the time the fiber is exposed to that atmosphere. When the vessel is opened, the fiber cools rapidly (<5 seconds), allowing the fiber to retain the full content of hydrogen. If the fiber is used immediately, the exact degree of photosensitization may be known. This precise control allows the manufacturer to vary the hydrogen content in each fiber by varying either the temperature, pressure, and/or time of exposure. Fiber photosensitivity can then be used to tailor the laser write times of gratings. It may also be used to equalize the photosensitivity of disparate fibers so the same writing conditions can be conveniently used to a variety of fibers.

A fiber loaded under high temperature conditions yields less of a change in the index of refraction of the fiber as compared to a fiber loaded at lower temperature conditions. When a fiber Bragg grating is annealed, the hydrogen in the fiber is diffused out, changing and stabilizing the index of refraction of the fiber. This process often results in a 50% decrease in the UV-induced index change with fibers loaded at lower temperatures. The high temperature loading approach allows has resulted in index changes as low as 15%. A reduced index change at the anneal process has the advantage of reducing the time, and/or laser power required to write a grating.

While the present invention has been described with a reference to exemplary embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An apparatus for exposing only a selected portion of a length of optical fiber to a hydrogen atmosphere loading process, the apparatus comprising:
    a loading chamber that encloses at least the selected portion of the optical fiber and contains a hydrogen atmosphere;
    at least one pressure seal in contact with at least one end section of the selected portion of the optical fiber; and
    at least one heating element that regionally heats the hydrogen atmosphere surrounding the selected portion.

2. The apparatus of claim 1, wherein the heating element heats the hydrogen atmosphere to a temperature of at least 250° C.

3. The apparatus of claim 1, wherein the loading chamber is a pressure chamber capable of containing a pressurized atmosphere.

4. The apparatus of claim 1, wherein the chamber is designed to contain pressures up to 3,000 psi.

5. The apparatus of claim 1, wherein the loading chamber encloses only the selected portion of a continuous length of optical fiber.

6. The apparatus of claim 1, wherein the loading chamber comprises a first tube concentrically surrounding only the selected portion of the optical fiber.

7. The apparatus of claim 6 wherein the at least one pressure seal comprises gas seals that are positioned at ends of the first tube, which contain the hydrogen atmosphere while allowing passage of the length of optical fiber.

8. The apparatus of claim 1 wherein the at least one pressure seal comprises gas seals that are attached to end sections of the selected portion of the optical fiber.

9. The apparatus of claim 1, further comprising cooling tubes attached to ends of a first tube concentrically surrounding the selected portion of the optical fiber, wherein the cooling tubes define cooling areas and the cooling tubes include seals that separate the cooling areas from the loading chamber.

10. The apparatus of claim 1, wherein the loading chamber comprises a vessel enclosing the entire length of optical fiber, wherein the heating element is positioned adjacent the selected portion of the optical fiber.

11. The apparatus of claim 1, further comprising a reel-to-reel arrangement, wherein end portions of the length of the optical fiber are wound on laterally spaced reels and the selected portion is suspended midspan.

12. The apparatus of claim 10, wherein the vessel is a pressure bell capable of containing high-pressure atmospheres.

13. The apparatus of claim 1, further comprising first and second clamping vessel blocks, the vessel blocks having pockets that define the loading chamber when the vessel blocks are clamped together.

14. The apparatus of claim 1, further comprising cooling regions that cool portions of the fiber adjacent to the selected portion.

15. The apparatus of claim 1, further comprising a cooling region and a mechanism that moves the fiber from the loading chamber to the cooling region.

16. The apparatus of claim 15, wherein the mechanism comprises a movable magnet and a magnetic body attached to the fiber.

17. The apparatus of claim 1, further comprising a cooling region and a cooling device that regulates the temperature of the cooling region.

18. The apparatus of claim 1, further comprising a pre-heating chamber that is capable of heating the hydrogen atmosphere prior to introducing the hydrogen atmosphere into the loading chamber.

19. The apparatus of claim 1, wherein the heating element comprises a pre-heating chamber that is capable of heating the hydrogen atmosphere prior to introducing the hydrogen atmosphere into the loading chamber.

20. The apparatus of claim 1, wherein the heating element comprises a controllable heater within the loading chamber, wherein the heating element is placed adjacent to the location for the selected portion of the fiber.

21. The apparatus of claim 1, further comprising gas inlet and vent lines that can inject and vent the hydrogen atmosphere in the loading chamber.

22. The apparatus of claim 1, wherein the at least one pressure seal is adapted to help contain a hydrogen atmosphere within the loading chamber and is physically affixed to the optical fiber.

23. The apparatus of claim 1, wherein the at least one pressure seal comprises a curable elastomer.

24. The apparatus of claim 1, wherein the at least one pressure seal is located at a boundary between the selected portion of the optical fiber and a non-selected portion.

25. The apparatus of claim 1, wherein the at least one pressure seal comprises a re-closable seal that is in contact with the optical fiber when the hydrogen atmosphere is contained in the loading chamber.

26. The apparatus of claim 25, wherein the at least one re-closable seal is located at a boundary between the selected portion of the optical fiber and a non-selected portion.

27. The apparatus of claim 25, wherein the at least one re-closable seal comprises an elastomeric collet.

28. An in-line apparatus for producing a grating in an optical fiber, comprising an optical fiber phosensitizing apparatus for selectively exposing only a selected portion of an optical fiber to a hydrogen atmosphere loading process, the apparatus comprising:
    a loading chamber that encloses at least the selected portion of the optical fiber and contains a high-temperature hydrogen atmosphere;
    at least one pressure seal in contact with at least one end section of the selected portion of the optical fiber; and
    a heating region that locally heats the hydrogen atmosphere surrounding the selected portion to at least 250° C.

29. The apparatus of claim 28, further comprising an advancing mechanism to advance the selected portion of the optical fiber out of the loading chamber after loading has been completed.

30. The apparatus of claim 29, wherein the advancing mechanism permits advancing a second selected portion of the optical fiber into the loading chamber after loading of the selected portion has been completed.

31. An apparatus for exposing only a selected portion of a length of optical fiber to a hydrogen atmosphere loading process, the apparatus comprising:
- a loading chamber that encloses at least the selected portion of the optical fiber and contains a hydrogen atmosphere;
- at least one heating element that regionally heats the hydrogen atmosphere surrounding the selected portion; and
- a pre-heating chamber adapted to heat the hydrogen atmosphere prior to introducing the hydrogen atmosphere into the loading chamber.

32. An apparatus for exposing only a selected portion of a length of optical fiber to a hydrogen atmosphere loading process, the apparatus comprising:
- a loading chamber that encloses at least the selected portion of the optical fiber and contains a hydrogen atmosphere;
- at least one heating element that regionally heats the hydrogen atmosphere surrounding the selected portion; and
- first and second clamping vessel blocks, the vessel blocks having pockets that define the loading chamber when the vessel blocks are clamped together.

* * * * *